UNITED STATES PATENT OFFICE.

EUG. PALLU, OF PARIS, FRANCE, ASSIGNOR TO SOCIÉTÉ ANONYME DES SEYCHELLES, OF SAME PLACE.

IMPROVEMENT IN TREATMENT OF COCOA-NUT FIBER FOR MANUFACTURE OF VARIOUS USEFUL PRODUCTS.

Specification forming part of Letters Patent No. 202,662, dated April 23, 1878; application filed January 18, 1878.

*To all whom it may concern:*

Be it known that I, EUG. PALLU, of Paris, France, acting in the name and as delegate-director of the Société Anonyme des Seychelles, of Paris, France, have invented a Treatment of Cocoa-Nut Fiber for the Manufacture of Various Useful Products; and I do hereby declare that the following is a full, clear, and exact description of the same.

This invention relates to the treatment of cocoa-nut fiber for the manufacture therefrom of a material suitable as a substitute for horse-hair and for other purposes.

Cocoa-nut fibers, as obtained in India, by a prolonged retting and a manual disintegrating process, suffer in the course of this operation a loss of strength and elasticity, and the fermentation set up in the retting process, not being entirely arrested, continues to impair the fiber while in the manufactured state. Certain fibers only of the cocoa-nut, obtained by a rapid mechanical disintegrating process, are suitable for producing a material having the same qualities as what is known as "vegetable hair," as regards strength, suppleness, and elasticity.

Cocoa-nut fibers are of several kinds, one only, by the length, size, and elasticity of the fiber, being more particularly applicable for the manufacture of a substitute for horse-hair, while the other kinds are capable of being employed for the purposes hereinafter mentioned, and claimed as new applications.

The fibers are separated by a breaker carding-engine, such as is used for preparing other fibers, but especially arranged for effecting the sorting of the fibers.

I do not claim the application of this known machine for treating a known material. This machine forms the fibers into slivers, which then receive a slight twist, in order to maintain the parallelism of the fibers in the subsequent operations. The slivers are cut of a certain length, and then immersed in a bleaching-solution, after which they are rapidly dried in a closed chamber by a current of dried and superheated air charged with sulphur vapors. The slivers are then dyed, usually of a black color, in a bath composed, for example, of a solution of tannate and gallate of iron, the processes being the same as those ordinarily employed for dyeing vegetable or animal fibers and tissues of a black color. Aniline blacks may also be used for the purpose. The slivers are then twisted or curled by mechanical means, to increase the elasticity of the fibers.

Cocoa-nut fibers converted into "hair" in the manner described are superior to all kinds of vegetable or animal hair, and possess the further advantage of being inimical to insect life.

The following are some among the many purposes to which the raw, dyed, or spun fibers may be applied:

First. Treated as above described, they may be used as a substitute for white or black horse-hair.

Second. Treated as above described and spun, they may be used for the manufacture of all kinds of sacking, and more particularly the hairs or strainers used in expressing beet-root pulp and in stearine and oil-works. When used for the latter purposes, they present the advantages of great elasticity, strength, durability, and cheapness. The fibers may also be used for making cordage, sail-cloth, oil-cloths, tarpaulins, and other stout fabrics. Fabrics of a finer quality may also be made by mixing the cocoa-nut fibers with other vegetable or animal textile materials, such as wool, cotton, hemp, flax, china-grass, *Phormium tenax*, ramie, aloe, &c.

Third. The fibers, in a raw state, may also be used as a substitute for oakum for calking vessels, either alone or mixed with oakum or other materials; also for piston and other packings generally. The fibers, either in the form of ropes or in layers, secured in any suitable way, may also be used for covering cylinders, steam and hot-water pipes, to prevent loss of heat, and may also be applied to refrigerators and other like apparatus, to prevent the transmission of heat thereto.

It should be understood that the invention is not limited to the applications above specified, which are given merely as examples, as the right is reserved of substituting these fibers in all cases in which textile fibers are used.

I claim—

1. The process of treating cocoa-nut fiber by forming the same into slivers, then bleaching the slivers, next drying them by a current of hot air charged with sulphur vapors, and finally dyeing the same, substantially as specified.

2. The process of making cocoa-nut fiber into imitation horse-hair by twisting the same before bleaching and drying, and also after the fibers have been dried by a current of hot-air charged with sulphur vapors, substantially as specified.

EUG. PALLU.

Witnesses:
ROBT. M. HOOPER,
EUGÈNE HÉBERT.